United States Patent
Hara et al.

(10) Patent No.: US 7,549,354 B2
(45) Date of Patent: Jun. 23, 2009

(54) SHIFT FORK POSITION DETECTING DEVICE FOR MANUAL TRANSMISSION

(75) Inventors: Tomoyuki Hara, Kanagawa (JP); Satoshi Gotoh, Kanagawa (JP)

(73) Assignee: Nissan Motor Co., Ltd., Yokohama-Shi (JP)

( * ) Notice: Subject to any disclaimer, the term of this patent is extended or adjusted under 35 U.S.C. 154(b) by 721 days.

(21) Appl. No.: 11/180,693

(22) Filed: Jul. 14, 2005

(65) Prior Publication Data

US 2006/0011008 A1 Jan. 19, 2006

(30) Foreign Application Priority Data

Jul. 15, 2004 (JP) .............................. 2004-208816

(51) Int. Cl.
*B60K 20/00* (2006.01)
(52) U.S. Cl. ................................... 74/473.37
(58) Field of Classification Search ................ 74/473.3, 74/473.31, 473.32, 473.33, 473.34, 473.35, 74/473.36, 473.37
See application file for complete search history.

(56) References Cited

U.S. PATENT DOCUMENTS

| | | | |
|---|---|---|---|
| 5,068,583 A | | 11/1991 | Gresham et al. |
| 5,160,918 A | * | 11/1992 | Saposnik et al. ............ 345/161 |
| 6,164,149 A | * | 12/2000 | Ohmori et al. ............ 74/336 R |
| 6,601,685 B2 | * | 8/2003 | Nagasaka et al. ............ 192/218 |
| 6,833,697 B2 | | 12/2004 | Van Ostrand et al. |
| 6,848,331 B2 | * | 2/2005 | Syamoto .................. 74/473.23 |
| 6,867,583 B2 | | 3/2005 | Mizutani et al. |
| 2004/0237692 A1 | * | 12/2004 | Syamoto et al. .......... 74/473.12 |

FOREIGN PATENT DOCUMENTS

| | | |
|---|---|---|
| DE | 42 08 888 A1 | 9/1993 |
| DE | 199 24 995 A1 | 12/2000 |
| EP | 0 882 912 A2 | 12/1998 |
| JP | 08-320054 A | 12/1996 |

\* cited by examiner

*Primary Examiner*—Vicky A Johnson
(74) *Attorney, Agent, or Firm*—Foley & Lardner LLP

(57) ABSTRACT

A shift fork position detecting device for a manual transmission is provided. The manual transmission includes a coupling sleeve constituting a synchronizer, a shift fork movable with the coupling sleeve and an actuator for moving the shift fork. The actuator has a stationary main body and a reciprocal output member operatively connected to the shift fork. The shift fork position detecting device includes a magnet mounted on the output member of the actuator, and a magnetic sensor mounted on the main body of the actuator to cooperate with the magnet for detecting the position of the shift fork.

16 Claims, 5 Drawing Sheets

PRIOR ART

PRIOR ART

PRIOR ART

SHIFT FORK POSITION DETECTING DEVICE FOR MANUAL TRANSMISSION

BACKGROUND OF THE INVENTION

The present invention relates in general to a manual transmission and particularly to a twin clutch manual transmission having automatic clutches for respective gear range groups and useful for performing automatic shifting by switching of the automatic clutches between an engaged condition and a disengaged condition and by alternative selection of a gear range between the gear range groups. More particularly, the present invention relates to a shift fork position detecting device for a manual transmission such as a twin-clutch manual transmission.

Heretofore, such a twin clutch manual transmission is known as disclosed in Unexamined Japanese Patent Publication No. 8-320054. The twin clutch manual transmission includes a first input shaft and second input shaft to which rotational power of an engine is selectively supplied by way of respective automatic transmissions. The second input shaft is hollow and is rotatably fitted on the first shaft. The first input shaft protrudes from the second input shaft so as to have a protruded rear end portion. Between the protruded rear end portion of the first input shaft and a counter shaft in parallel with the first and second input shafts are disposed gear trains of an even number gear range group that are selectively operated by respective synchronizers so as to transmit power therethrough and gear trains of an odd number gear range group that are selectively operated so as to transmit power therethrough by respective synchronizers. Rotational power having been changed in speed in accordance with a selected gear range is taken out from the front end of the counter shaft that is positioned adjacent the engine.

Such a twin clutch manual transmission is adapted so that under a condition where a gear range of one of the gear range groups is selected and its corresponding automatic clutch is engaged, selection of any gear range of the other of the gear range groups is not performed. Upon shifting from the selected gear range, a gear range of the other gear range group is selected by a corresponding synchronizer and its corresponding automatic clutch is disengaged. Then, the automatic clutch corresponding to the one gear range group is disengaged and the automatic clutch corresponding to the other gear range group is engaged, i.e., switching of the clutches between an engaged condition and a disengaged condition is performed, together with alternative selection of the gear range between the both gear range groups. By this, although the transmission is a manual transmission, it can perform an automatic shifting.

FIGS. 4 to 7 show a shift fork assembly according to an earlier technology which can be used in such a twin clutch manual transmission. The shift fork assembly includes shift fork 56 having shift fork main body 54 straddling a nearly semi-circular part of circular outer circumferential groove 53 of coupling sleeve 52 of synchronizer 51 and engagement portion 55 engaged in outer circumferential groove 53 and thereby gripping the same.

In such shift fork 56, shift fork main body 54 is slidably mounted on shift shaft 57. By moving shift fork main body 54 axially of shift shaft 57 by actuator 58 coupled with shift fork 56, coupling sleeve 52 of synchronizer 51 is moved axially thereof for thereby engaging, under a synchronizing operation of synchronizer ring 59, a splined inner circumferential periphery of coupling sleeve 52 with clutch gear 60 or 61 of any one of the gear trains provided to the counter shaft and the input shaft, thereby selecting a gear range.

SUMMARY OF THE INVENTION

In order that such a twin clutch manual transmission can perform automatic shifting, it is necessitated to detect axial movement of shift fork 56 relative to shift shaft 57 by means of a shift fork detecting device having permanent magnets 62 and magnetic sensor 64. Specifically, it is necessitated to mount magnets 62 on bracket 63 which is in turn mounted on a mounting portion of shift fork 56 at which shift fork 56 is slidably mounted on shift shaft 57 so as to protrude therefrom and mount magnetic sensor 64 on a transmission at any position thereof, i.e., herein mount magnetic sensor 64 on an inner wall of a transmission casing (not shown) by way of a bracket (also not shown) so as to be opposed to or face magnets 62.

Such a detecting device using a magnet and a magnetic sensor for detecting a rectilinear movement of a moving body is known as disclosed in U.S. Pat. Nos. 6,833,697 and 6,867,583. Namely, when permanent magnet 62 moving together with shift fork 56 displaces relative to magnetic sensor 64 and the magnetic flux density detected by magnetic sensor 64 changes, it is possible to detect the displacement of permanent magnet 62, and hence of shift fork 56.

In the meantime, such a shift fork position detecting device has a difficulty in mounting bracket 63 that supports magnet 62 on shift fork 56 and mounting magnetic sensor 64 on the transmission casing. Further, in mounting magnet 62 on shift fork 56 by way of bracket 63, there is a possibility that due to vibrations of bracket 63, the supporting rigidity with which magnet 62 is supported on bracket 63 is lowered, the durability of bracket 63 of itself is lowered, and in case bracket 63 is fastened to shift fork 56 by screws 65, the durability of a fastening portion by using screws 65 is lowered. Further, since magnet 72 is mounted on shift fork 56 and magnetic sensor 64 is mounted on the transmission casing, there is a problem that adjustment of the space between magnet 62 and magnetic sensor 64 is difficult.

It is accordingly an object of the present invention to provide a shift fork position detecting device for a twin clutch manual transmission which is free from the above-described problems, i.e., which is easy in assembly, capable of increasing the supporting rigidity of a magnet and easy in adjustment of the space between the magnet and the magnetic sensor.

To achieve the above object, there is provided according to an aspect of the present invention a shift fork position detecting device for a manual transmission having a coupling sleeve constituting a synchronizer, a shift fork movable with the coupling sleeve and an actuator for moving the shift fork, the actuator having a stationary main body and a reciprocal output member operatively connected to the shift fork, the shift fork position detecting device comprising a magnet mounted on the output member of the actuator, and a magnetic sensor mounted on the main body of the actuator to cooperate with the magnet for detecting the position of the shift fork.

According to another aspect of the present invention, there is provided a manual transmission comprising a synchronizer having a coupling sleeve, a shift fork movable with the coupling sleeve, an actuator for moving the shift fork, the actuator having a stationary main body and a reciprocal output member operatively connected to the shift fork, and a detecting device for detecting a position of the shift fork, the detecting device having a magnet mounted on the output member of the actuator, and a magnetic sensor mounted on the main body of the actuator to cooperate with the magnet for detecting the position of the shift fork.

DESCRIPTION OF THE PREFERRED EMBODIMENTS

Figure 1:
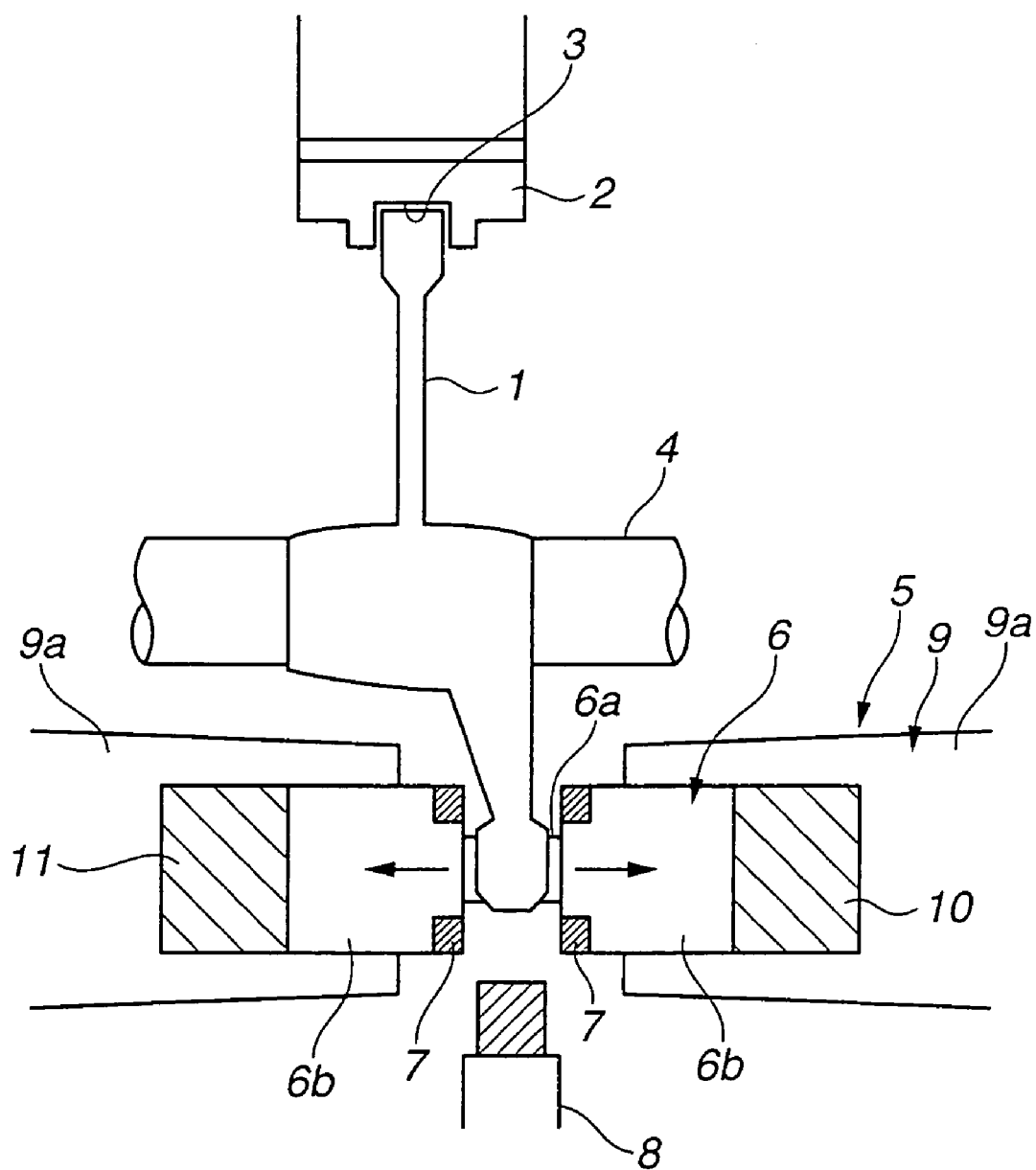
FIG. 1 is a schematic view of a shift fork position detecting device for a twin clutch manual transmission according to an embodiment of the present invention.

Referring first to FIG. 1, a shift fork position detecting device for a twin clutch manual transmission according to an embodiment of the present invention will be described. In FIG. 1, shift fork 1 is engaged in outer circumferential groove 3 of coupling sleeve 2 that constitutes a synchronizer of a twin clutch manual transmission while being slidably mounted to shift shaft 4 disposed in parallel with the center axis of coupling sleeve 2. Actuator 5 has stationary main body 9 and reciprocal output member 6 operatively connected to shift fork 1 for moving shift fork 1 axially thereof Output member 6 has a pair of sliding sections 6b and connecting section 6a between sliding sections 6b. Output member 6 is coupled at connecting section 6a with shift fork 1. Main body 9 of actuator 5 has a pair of cylinder sections 9a in which respective sliding sections 6b of output member 6 are slidably installed.

Two permanent magnets 7 in the form of a circular ring are embedded in sliding sections 6b of output member 6 so as to be positioned next to connecting section 6a (i.e., mounted on sliding sections 6b at nearer axial ends thereof) and in a way as to have exposed circumferential peripheries concentric with output member 6. Magnetic sensor 8 is mounted on main body 9 of actuator 5 by means of bracket (not shown) so as to be opposed to connecting section 6a of output member 6.

Oil pressure chambers 10 and 11 are formed between main body 9 and output member 6 of actuator 5, more specifically, between cylinder sections 9a of main body 9 and respective sliding sections 6b of output member 6. By supplying and discharging oil pressure into and out of oil pressure chambers 10 and 11, output member 6 is driven in the left-hand and right-hand directions in the figure.

Though actuator 5 of a hydraulically operated type is herein used, it is not for the purpose of limitation. For example, an actuator of an electromagnetically operated type or pneumatically operated type may be used.

By mounting magnets 7 directly on output member 6 of actuator 5, the bracket otherwise necessitated for mounting the magnets to the shift fork can be dispensed with, thus making it possible to solve the problems inherent in the earlier technology, i.e., lowering of the supporting rigidity of the magnet supported by the bracket, lowering of the durability of the bracket itself, lowering of the durability of a bracket fastening portion at which the bracket is fastened to the shift fork by screws due to vibrations of the bracket, and a difficulty in mounting the bracket to the shift fork. Further, by arranging the magnetic sensor 8 so as to be supported on main body 9 of actuator 5, assembling or installation of magnetic sensor 8 can be attained with ease and adjustment of the space between each magnet 7 mounted on output member 6 and magnetic sensor 8 can be attained with ease.

Further, by forming magnet 7 into a circular ring shape and mounting the same concentrically on output member 6 that is cylindrical, it becomes possible to maintain a space between each magnet 7 and magnetic sensor 8 within a predetermined range while enabling each magnet 7 to be always held at a position opposed to or facing magnetic sensor 8 even when output member 6 is rotated relative to main body 9 of actuator 5, thus making it possible to make higher the accuracy in detection of the position of shift fork 1.

Figure 2:
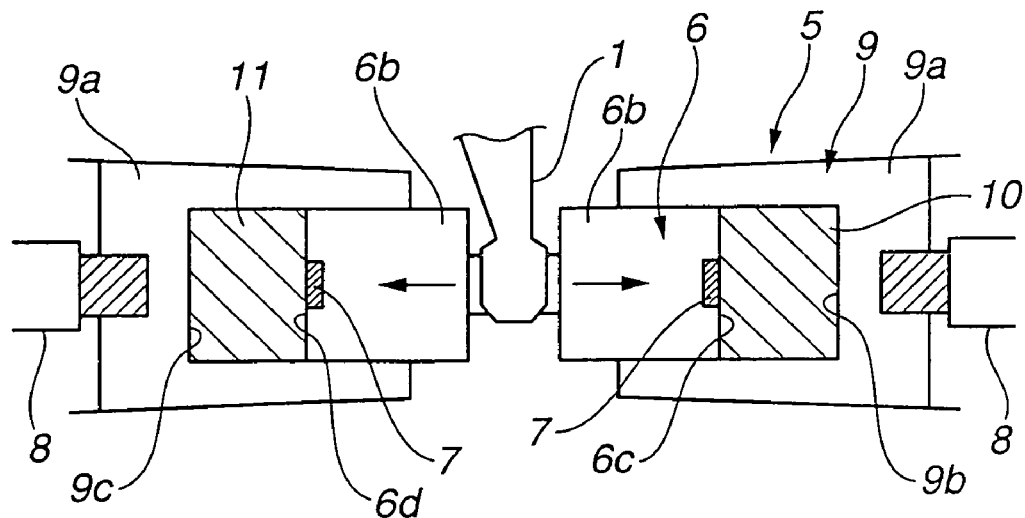
FIG. 2 is an enlarged schematic view of a portion of a shift fork position detecting device according to another embodiment of the present invention.

FIG. 2 shows a shift fork position detecting device according to a further embodiment.

Referring to FIG. 2, magnets 7 are in the form of a solid block and embedded in respective axial end surfaces 6a and 6b of output member 6 in a way as to be exposed to the outside. Magnetic sensors 8 are embedded in main body 9 of actuator 5 so as to be positioned and exposed at remoter axial ends 6c and 6d of sliding sections 6b. Cylindrical sections 9a of main body 9 of actuator 5 are bottomed to have inner end surfaces 9b and 9c opposed to respective remoter axial ends 6c and 6d of sliding sections 6b of output member 6. Two magnetic sensors 8 are embedded in main body 9 of actuator 5 so as to be positioned and exposed at inner end surfaces 9b and 9c axially opposed to respective remoter axial ends 6b and 6c of output member 6 or so as to be positioned adjacent inner end surfaces 9b and 9c.

By mounting magnetic sensors 8 on main body 9 of actuator 5 in the above-described manner, a bracket otherwise necessitated according an earlier technology can be dispensed with, thus enabling magnetic sensors 8 to be installed in place with ease and with an increased rigidity.

Figure 3:
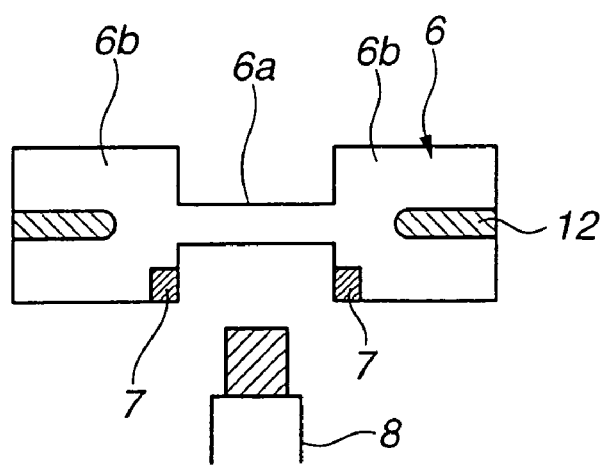
FIG. 3 is an enlarged schematic view of a portion of a shift fork position detecting device according to a further embodiment.
Figure 4:
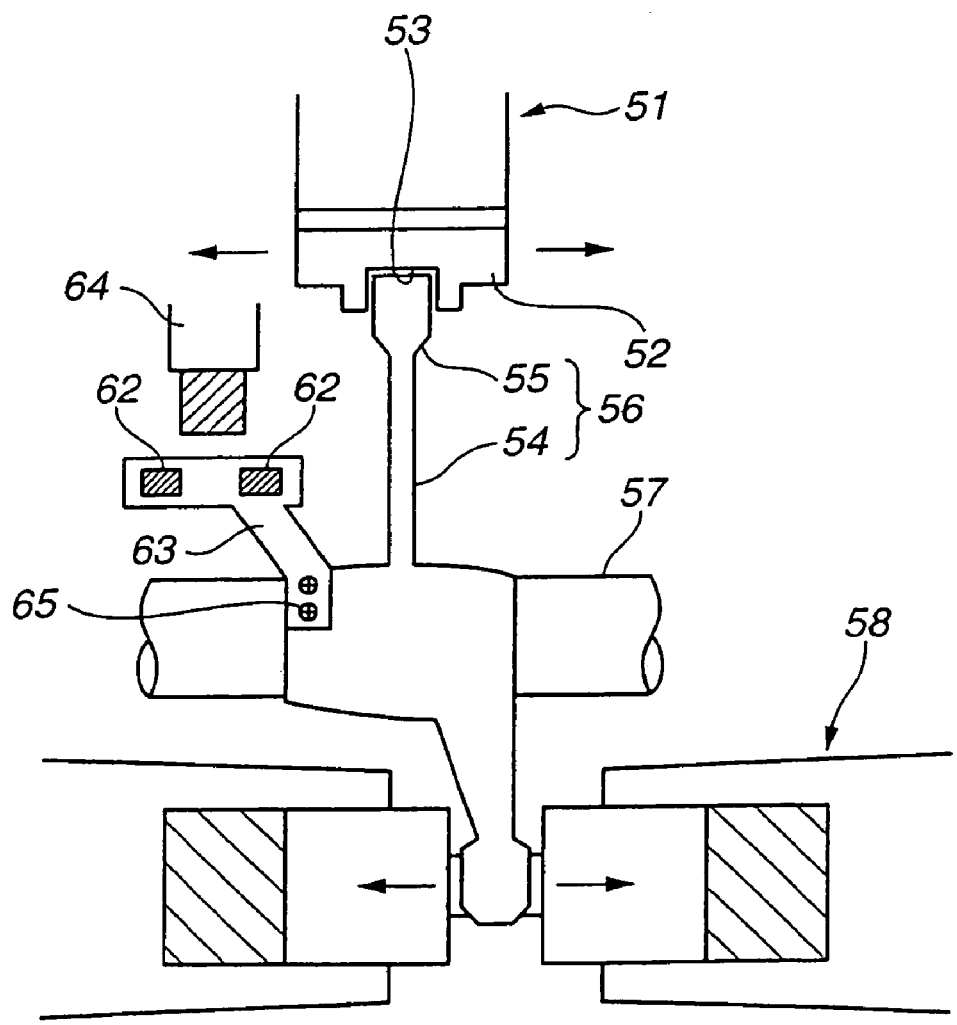
FIG. 4 is a schematic view of a shift fork position detecting device for a twin clutch manual transmission according to an earlier technology.
Figure 5:
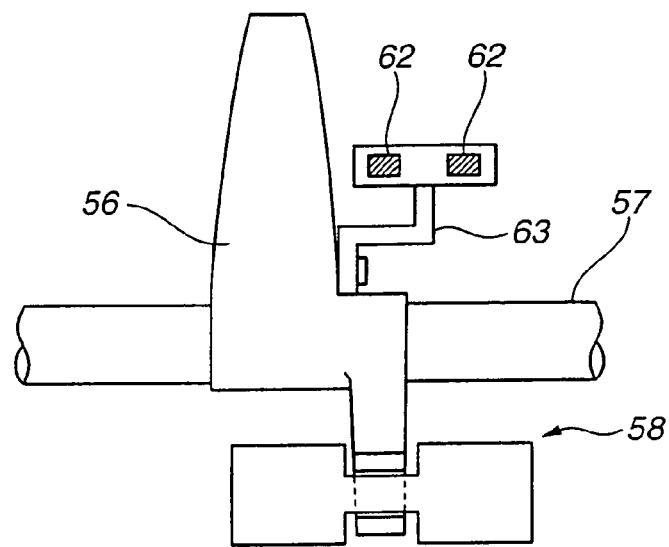
FIG. 5 is a schematic view of a shift fork position detecting device according to another earlier technology.
Figure 6:
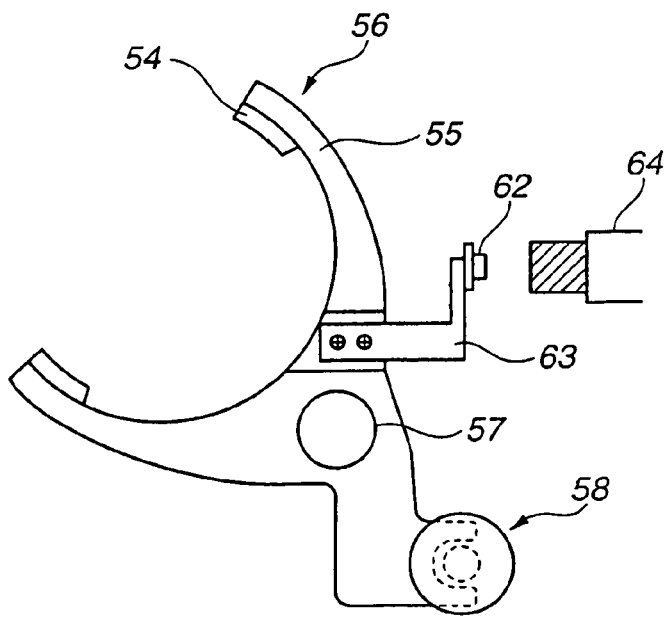
FIG. 6 is a schematic side elevation of the shift fork position detecting device of FIG. 5.
Figure 7:
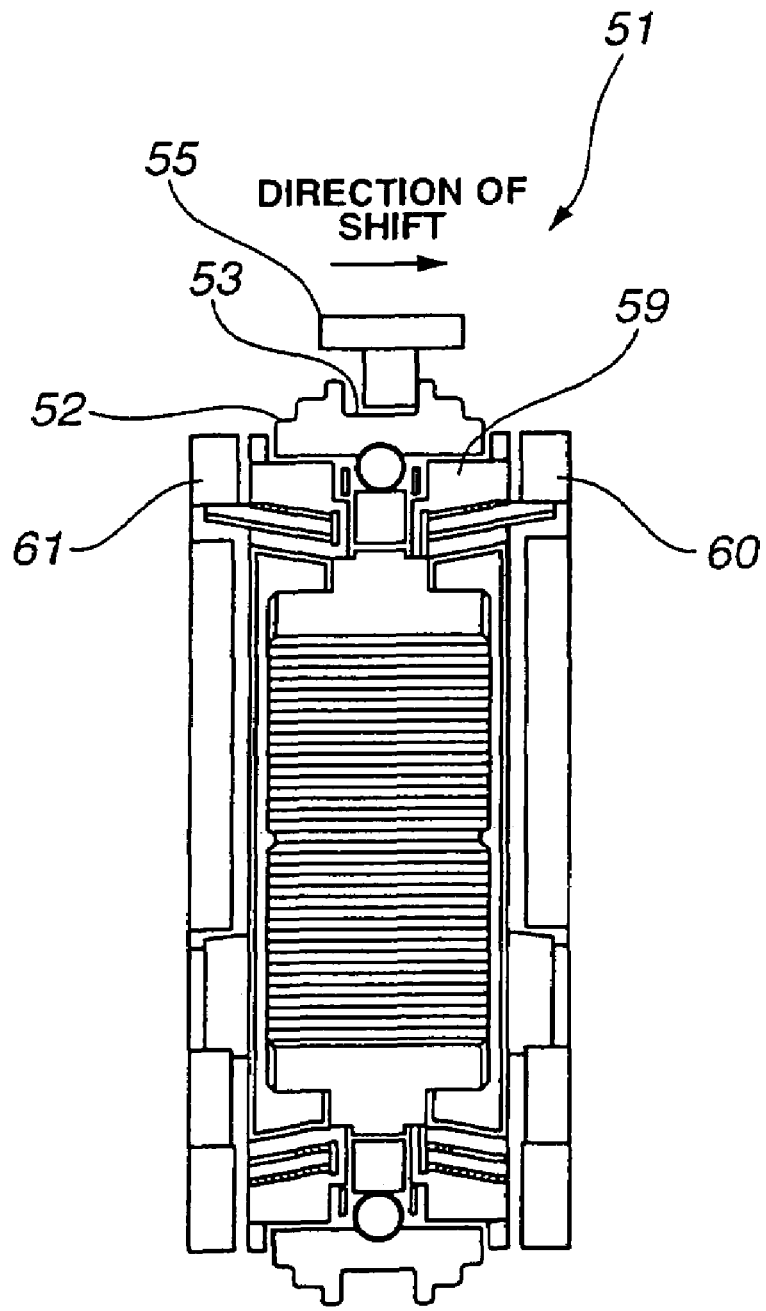
FIG. 7 is a schematic view of a synchronizer for a twin clutch manual transmission according to an earlier technology.

FIG. 3 shows a shift fork position detecting device according to a further embodiment.

In this embodiment, on condition that output member 6 of actuator 5 is cylindrical in shape, magnets 7 are embedded in output member 6 at a position next to connecting section 6a and each opposed to magnetic sensor 8 in a way as to have an exposed surface, i.e., magnets 7 are mounted on sliding sections 6b of output member 6 so as to be opposed to magnetic sensor 8. Output member 6 has a pair of axial grooves or projections 12 at outer circumferential peripheries of sliding sections 6b. Though not shown, main body 9 of actuator 5 has at inner circumferential peripheries of cylinder sections 9a (refer to FIG. 2) projections or grooves fittingly engageable with grooves or projections 12 of output member 6. Grooves or projections 12 of output member 6 cooperate with the projections or grooves of main body 9 to constitute a means for preventing rotation of output member 6 relative to main body 9 of actuator 5.

By this, magnet 7 can be provided only at a position opposed to magnetic sensor 8 and therefore can be smaller in shape and it becomes possible to reduce the work time for forming and installation of magnet 7.

The entire contents of Japanese Patent Application P2004-208816 (filed Jul. 15, 2004) are incorporated herein by reference.

Although the invention has been described above by reference to certain embodiments of the invention, the invention is not limited to the embodiments described above. Modifications and variations of the embodiment described above will occur to those skilled in the art, in light of the above teachings. The scope of the invention is defined with reference to the following claims.

What is claimed is:

1. A manual transmission comprising:
a synchronizer having a coupling sleeve;
a shift fork movable with the coupling sleeve;
an actuator for moving the shift fork, the actuator having a stationary main body and a reciprocal output member operatively connected to the shift fork; and
a detecting device for detecting a position of the shift fork;
the detecting device having a magnet mounted on the output member of the actuator, and a magnetic sensor mounted on the main body of the actuator to cooperate with the magnet for detecting the position of the shift fork,
wherein the output member of the actuator has a sliding section that is cylindrical and at which the sliding section is slidably mounted on the main body, the magnetic sensor being positioned radially outward of the output member, the magnet being mounted on the output member at a position opposed to the magnetic sensor, the actuator having means for preventing rotation of the output member relative to the main body.

2. The manual transmission according to claim 1, wherein the magnet is embedded in the cylindrical sliding section of the output member.

3. The manual transmission according to claim 1, wherein means for preventing rotation of the output member relative to the main body comprises one of grooves or projections on the output member that cooperate with the other of projections or grooves on the main body.

4. The manual transmission according to claim 1, wherein the cylindrical sliding section of the output member is configured to slide within a recess located in the main body such that an outer circumferential periphery of the cylindrical sliding section slides along an inner circumferential periphery of the recess.

5. The manual transmission according to claim 1, wherein the cylindrical sliding section is a first cylindrical sliding section of two cylindrical sliding sections, and wherein the two cylindrical sliding sections are slidably mounted on the main body.

6. The manual transmission according to claim 5, wherein the magnet is a first magnet of two magnets, wherein the first magnet is embedded in the first cylindrical sliding section of the output member, and wherein a second of the two magnets is embedded in a second cylindrical sliding section of the two cylindrical sliding sections.

7. The manual transmission according to claim 5, wherein the first cylindrical sliding section of the output member is configured to slide within a first recess located in the main body such that an outer circumferential periphery of the first cylindrical sliding section slides along an inner circumferential periphery of the first recess.

8. The manual transmission according to claim 7, wherein a second cylindrical sliding section of the two cylindrical sliding sections is configured to slide within a second recess located in the main body such that an outer circumferential periphery of the second cylindrical sliding section slides along an inner circumferential periphery of the second recess.

9. A manual transmission comprising:
a synchronizer having a coupling sleeve;
a shift fork movable with the coupling sleeve;
an actuator for moving the shift fork, the actuator comprises a stationary main body and a reciprocal output member operatively connected to the shift fork; and
a detecting device for detecting a position of the shift fork;
wherein the detecting device comprises a magnet mounted on the output member of the actuator, and a magnetic sensor mounted on the main body of the actuator to cooperate with the magnet for detecting the position of the shift fork,
wherein the output member of the actuator comprises a sliding section that is cylindrical and wherein the cylindrical sliding section is slidably mounted on the main body,
wherein the magnetic sensor is positioned radially outward of the output member,
wherein the magnet is mounted on the output member at a position opposed to the magnetic sensor,
wherein the actuator is configured to prevent rotation of the output member relative to the main body.

10. The manual transmission according to claim 9, wherein the actuator comprises one of grooves or projections on the output member that cooperate with the other of projections or grooves on the main body to prevent rotation of the output member relative to the main body.

11. The manual transmission according to claim 9, wherein the magnet is embedded in the cylindrical sliding section of the output member.

12. The manual transmission according to claim 9, wherein the cylindrical sliding section of the output member is configured to slide within a recess located in the main body such that an outer circumferential periphery of the cylindrical sliding section slides along an inner circumferential periphery of the recess.

13. The manual transmission according to claim 9, wherein the cylindrical sliding section is a first cylindrical sliding section of two cylindrical sliding sections at which the two cylindrical sliding sections are slidably mounted on the main body.

14. The manual transmission according to claim 13, wherein the magnet is a first magnet of two magnets, wherein the first magnet is embedded in the first cylindrical sliding section of the output member, and wherein a second of the two magnets is embedded in a second cylindrical sliding section of the two cylindrical sliding sections.

15. The manual transmission according to claim 13, wherein the first cylindrical sliding section of the output member is configured to slide within a first recess located in the main body such that an outer circumferential periphery of the first cylindrical sliding section slides along an inner circumferential periphery of the first recess.

16. The manual transmission according to claim 15, wherein a second cylindrical sliding section of the two cylindrical sliding sections is configured to slide within a second recess located in the main body such that an outer circumferential periphery of the second cylindrical sliding section slides along an inner circumferential periphery of the second recess.

* * * * *